Figure 4:
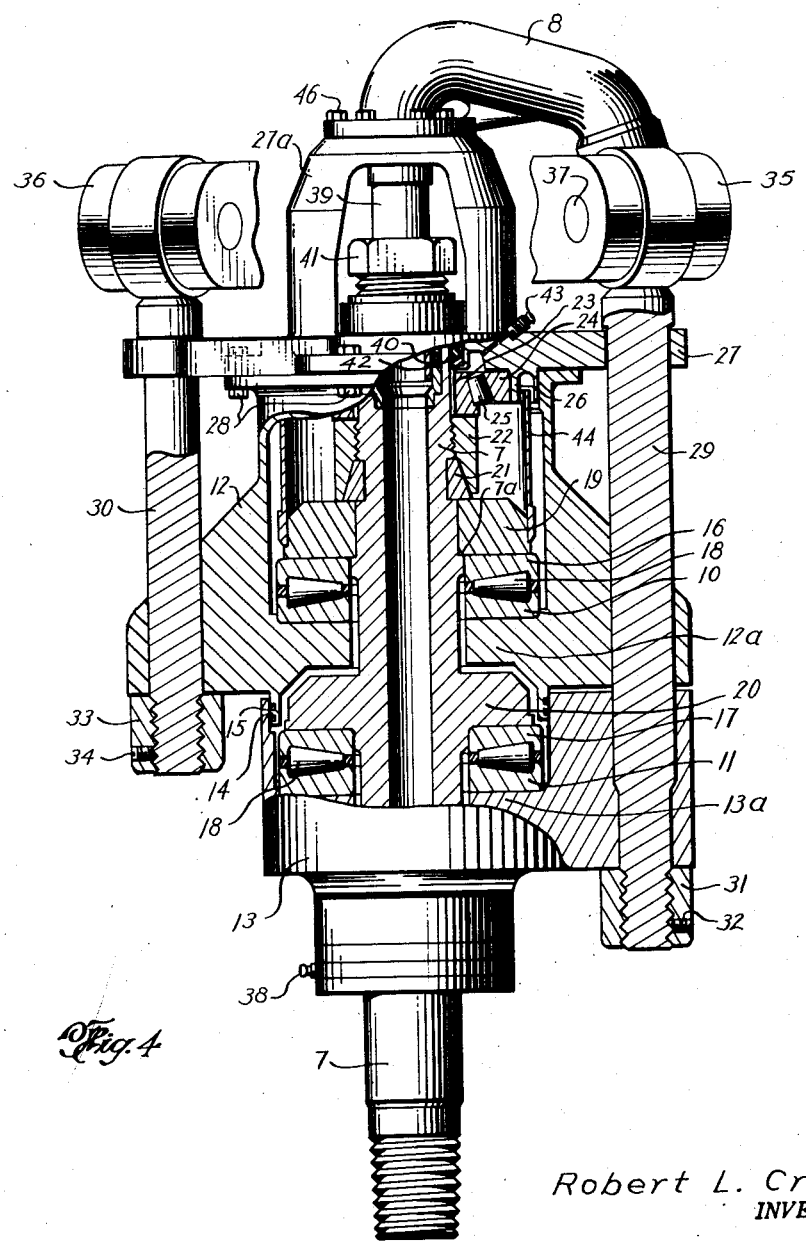

Sept. 16, 1952        R. L. CRAIN        2,610,828
ROTARY SWIVEL
Filed Nov. 19, 1949        2 SHEETS—SHEET 1
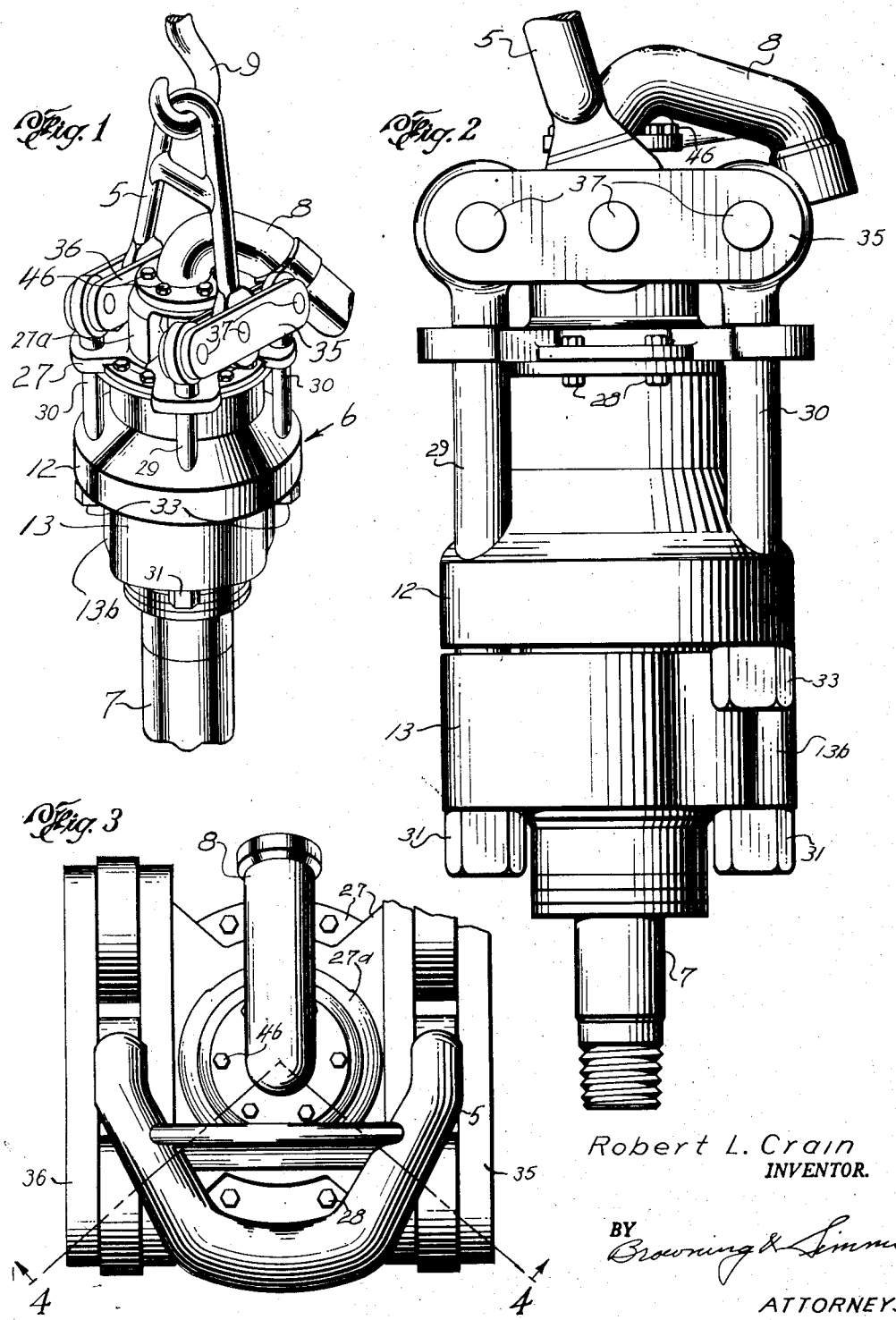
Robert L. Crain
INVENTOR.
BY Browning & Simms
ATTORNEYS Robert L. Crain
INVENTOR.

Patented Sept. 16, 1952

2,610,828

UNITED STATES PATENT OFFICE 2,610,828

ROTARY SWIVEL

Robert L. Crain, Houston, Tex., assignor to Gray Tool Company, Houston, Tex., a corporation of Texas Application November 19, 1949, Serial No. 128,352

9 Claims. (Cl. 255—25)

This invention relates to improvements in rotary swivels and refers more particularly to the means for transmitting the downward thrust from the swivel stem to the swivel bail.

The rotary swivel provides a means for connecting a drill pipe or other pipe string to a travelling block or other raising or lowering means associated with a well derrick, which will be referred to herein as an elevator, and also to the slush pump for circulating mud or the like in a well bore. With the advent of deeper wells, the weight due to the length of the pipe which must be supported by the rotary swivel has increased proportionately because the entire weight of the pipe string, except for that predetermined amount which is maintained against the drill bit or other bottom hole tool, must be supported by the swivel. In order to support these increasing loads, it has been the practice heretofore to increase the size of the thrust bearing surfaces by extending the anti-friction bearing elements, usually of the cone type, radially further outwardly from the swivel stem. However, the linear speed of any given portion of the bearing elements is a function of the length of the radii from the swivel stem axis to that particular point on the bearing elements.

It is not uncommon for rotary swivels to be turned at rates of as high as 250 R. P. M. At high rotational speeds, the friction and wear encountered in the roller bearing elements limit the degree of radial extension that these elements may be provided with. While it has sometimes been proposed to form the roller elements in the shape of frusto-conical cones which, were they extended, would have their apices at the longitudinal axis or rotational axis of the swivel stem, nevertheless, when the elements wear in use, they do not always wear uniformly and when the periphery of the cone has been altered from its predetermined conical shape, a sliding movement as well as the rolling movement of the cone, will take place between the cone and the bearing races. When this occurs, the friction within and rate of wear of the bearing means increases very rapidly. Because of these problems, it has been found to be impractical to indefinitely increase the radial extension of the roller cone elements.

In order to provide increased bearing surfaces to take the increasing loads encountered in present day well operations, it has been proposed to utilize a series of superimposed bearing arrangements between the swivel stem and the swivel housing. However, this has not proved successful because it has heretofore been impossible to equally distribute the thrust load over the series of bearings.

An object of this invention is to provide in a rotary swivel a very large bearing area for transmitting the thrust due to the weight of pipe suspended by the swivel stem to the bail and elevator.

Another object is to provide a rugged rotary swivel of simple construction which has long life in operation even where very large thrust loads are encountered.

A further object is to increase the bearing area for supporting the thrust load due to the weight of pipe suspended by the swivel without increasing the radial extension of any bearing element from the rotational axis of the swivel stem.

Still another object is to provide a rotary swivel having a plurality of bearing means for transmitting the thrust load due to the weight of pipe suspended by the swivel wherein the thrust load is substantially equally divided between the bearing means.

A still further object is to provide a rotary swivel having a plurality of bearing means for transmitting the thrust load due to the weight of pipe suspended by the swivel wherein the thrust load is substantially equally divided between the bearing means wherein all of the bearings which rotatably mount the swivel stem and the packing about the wash stem may be readily and adequately lubricated.

Even another object is to provide in a rotary swivel for a plurality of thrust bearing means for supporting the swivel stem with a swingletree connection between the swivel bail or fastening member and the bearing elements of each of the bearing means, which support the swivel stem, wherein these latter bearing elements are mounted for some to and fro movement whereby the thrust load may be distributed between these bearing elements in a predetermined ratio.

Even a further object is to provide in a rotary swivel means for distributing the thrust load from the swivel stem to the bail or fastening member through a plurality of separate roller bearing assemblies with each assembly transmitting a predetermined portion of the load.

Other and further objects of this invention will appear as its description proceeds.

In the accompanying drawings forming a part of the instant specification and which are to be read in conjunction therewith, Fig. 1 is a perspective view looking from the top and left of a rotary swivel embodying this invention, Fig. 2 is a side elevational view, upon an enlarged scale, of the swivel shown in Fig. 1, Fig. 3 is a top plan view of the swivel of the preceding figures, and Fig. 4 is a partially sectional view, upon an even enlarged scale, taken along the line 4—4 in Fig. 3 in the direction of the arrows.

The swivel of this invention has the conventional swivel parts including the bail or fastening member 5, the housing indicated generally at 6, the swivel stem 7 and gooseneck 8. The swivel is adapted to be connected by the bail 5 to a conventional lifting means, of which the hook 9 is shown in Fig. 1.

In order that the swivel may employ a plurality of thrust bearing elements carried within the housing wherein the thrust due to the load supported by the swivel stem is distributed uniformly to the various thrust bearing elements in accordance with a predetermined ratio, a means is employed for connecting the bail 5 to the plurality of thrust bearing elements 10 and 11 whereby the thrust supported by each element is counterbalanced through the bail 5 by the thrust supported by the other element. This may be accomplished by including in the housing 6 two parts 12 and 13 for supporting the elements 10 and 11 respectively. These parts 12 and 13 have a central passage therethrough to accommodate the swivel stem and have inturned flanges 12a and 13a respectively for supporting the thrust bearing elements or races 10 and 11 respectively. These housing parts 12 and 13 have telescoping portions shown at 14 with seal elements 15 sealing the joint. This telescoping joint permits limited movement of the parts 12 and 13 relative to each other along the longitudinal axis of the housing and the longitudinal axis of the swivel stem 7. The seals 15 serve to retain lubricant for the bearings in a manner to be hereinafter more fully explained.

The thrust bearing means or assemblies include the lower races 10 and 11 and upper races 16 and 17. These opposing races carry the roller bearings 18 held in place by the usual retainer rings as shown.

It will be seen that the two bearing assemblies are superimposed and that the lower race of each of the assemblies bears against the inturned flange of one housing part and that the upper races of the assemblies support the out-turned flange parts 19 and 20 carried by the swivel stem. For convenience of assembly, in the particular embodiment of the invention shown, the lower flange 20 is formed integrally with the stem 7 and the upper flange 19 has a close fit, such as for example, a press fit, upon the peripheral portion of stem 7 just above abutment shoulder 7a formed on the stem. To additionally secure flange 19 in place, wedge segments 21 are retained in place by collar 22 threaded to the swivel stem 7.

Upward thrust of the stem 7 is transmitted to the housing through a bearing assembly which also serves to center the upper end of the swivel stem in the housing. This bearing assembly includes the race 23, having a press fit upon a peripheral portion of the stem; an outer race 24; and intermediate bearing members 25. The outer race 24 has a close fit within the skirt 26 depending from the underside of head plate 27. The plate 27 is secured to the upper flange of housing part 12 by a plurality of fastening elements 28.

Turning back to the housing 6, it will be seen that the parts 12 and 13 are held together within limits by a plurality of bail bolts including long bolts 29 and short bolts 30. Two of the long bolts 29 are employed extending through diagonally opposed openings in plate 27 and openings in peripheral protuberances formed on both the upper and lower housing parts. A bail bolt nut 31 secured to the lower end of bail bolts 29 secure these bolts in place. Set screws 32 may be employed to prevent accidental unthreading of the nut 31. With the nut in place, the bail bolt 29 is anchored against longitudinal movement relative to the lower housing part 13 but is free to slide longitudinally upwardly through the upper part 12 and the cover plate 27. An annular shoulder at the upper end of bail bolt 29 limits downward movement of the bail bolt relative to the cover plate 27.

The short bolts 30 are also two in number but they extend through diagonally opposed openings in the plate 27. These bolts preferably are spaced from the rotational axis of stem 7 equidistant to the spacing of the bolts 29 and the lines between the centers of the long bolts and the centers of the short bolts will intersect substantially at the rotational axis of swivel stem 7 and the lines are disposed normally to each other. The short bolts 30 have nuts at their lower end shown at 33 which may have set screws 34 to prevent accidental unthreading of the nuts. The nuts 33 are jammed against the underside of upper part 12 of the housing and reside in cutaway peripheral portions 13b of the lower housing part as will be readily seen by reference to Fig. 1 and Fig. 2.

These long and short bail bolts provide a part of the connection between the bearing elements 10 and 11 and the bail 5. They also provide a part of the swingle-tree connection or counterbalancing connection between the bail and the thrust bearing elements. The upper ends of the bail bolts are connected to the bail through parallel crossbars 35 and 36 to which the bail ends are pivoted at substantially the center point. The crossbars 35 and 36 may be formed in two pieces with the eyes of the bail ends and bail bolts retained therebetween by a plurality of pins 37. Each end of the bail is connected by these crossbars to one long and one short bolt, that is, one bolt 29 and one bolt 30. This arrangement will be recognized as the well known swingletree employed for hitching teams to wagons and the like. It functions, as will be well understood by those skilled in the art, to equally distribute the thrust imposed upon the swivel stem to the plurality of bearing elements.

Referring back to the swivel stem, it will be seen that at its lower extremity it has a journal within a stuffing box arrangement at the lower end of part 13. This stuffing box arrangement may be in accordance with conventional practice but provides a seal between the swivel stem and the lower portion of the housing in order to retain a lubricant for the bearings which journal the swivel stem. An Alemite fitting 38 is provided in this stuffing box in order to inject lubricant into the interior of the housing.

At its upper end, the swivel stem has an enlarged diameter portion which receives the lower end of a wash pipe 39. A packing 40 provides a seal about the wash pipe and within the upper end of the swivel stem, gland nut 41 threaded to the upper end of the stem providing a means for tightening this packing.

Between the exterior of the swivel stem and the opening through cover plate 27 is a packing arrangement 42 which provides a seal against loss of lubricant from the interior of the housing. Vent fitting 43 communicating through an opening in the cover plate 27 with the interior of the housing provides a vent so that when a lubricant is injected into the lower end of the housing through fitting 38, it may completely fill the interior of the housing, and of course, additional lubricant can at any time be introduced into the housing through the fitting 38.

To provide a lubricant level within the housing sufficiently high to lubricate the bearing assembly including race 23, race 24 and bearings 25, the skirt 26, depending from the underside of plate 27, has a groove formed therein extending higher than the bearing members 25. Within this groove is an upstanding annular shield 44 which has a press fit upon flange 19. The upper end of the shield is at a level about mid-way of roller bearings 25. With this arrangement, even though the lower stuffing box arrangement between the lower end of the housing and the swivel stem should fail, still an adequate amount of lubricant will be retained to properly oil this upper bearing.

It will be seen that in the preferred embodiment shown in the drawings, the long and short bolts 29 and 30 do not extend into the interior of the housing so that the bolts need not be sealed as they pass through the cover plate 27 or the parts 12 and 13 of the housing. As especially shown in Fig. 4, the long bolts 29 have a reduced peripheral portion extending above the cover plate 27 somewhat so that slight shifting of the bolts either up or down is permitted. In this way, slight axial movement of the housing parts 12 and 13 are permitted so that the thrust bearing elements or races 10 and 11 are free to have some limited to and fro movement within the housing.

It is usually preferable to equally distribute the load upon the two bearing arrangements for taking the thrust of the swivel stem. However, if some other predetermined ratio is desired, this may be accomplished by shifting the pivot point of the bail ends with the crossbars 35 and 36 off center relative to the pivot points of the bail bolt ends for each of the crossbars, thereby changing the moment arm length through which each thrust component acts.

To facilitate adjustment of the upper bearing assembly 23, 24 and 25, it is desirable to separate the upper exterior flange of housing part 12 from the lower face of cover plate 27 by a plurality, such as 3 to 5 for instance, of shim rings of very small thickness as, for example, five thousandths of an inch thick. Then, when it is desired to tighten the bearing assembly 23, 24 and 25, this may be accomplished by removing one or more of the shim plates after releasing the fastening elements 28. This arrangement replaces the usual adjustment nut with its accompanying threads which tend to cause leaks of drilling fluid into the casing.

The cover plate 27 is provided centrally with risers 27a which support the upper connection of wash pipe 39 with the gooseneck connection 8. The free end of gooseneck connection 8 carries a fitting adapting it to be connected to a hose or the like for circulating fluids. A plurality of bolts 40 secure an external flange formed on the gooseneck to the upper portion or annular member provided by the risers 27a. The opening through the risers provides access for manipulation of gland nut 41. The seal for the gooseneck connection with the wash pipe has been omitted from the drawings in the interest of simplicity but may be accomplished in any conventional manner.

It is believed that assembly of the rotary swivel of this invention is apparent from the foregoing description. In operation the assembled swivel may be connected by the fastening member 5 to any suitable means such as hook 9 carried by a mechanism for raising or lowering the swivel. This mechanism may be the usual elevator found on well rigs and the like. The lower end of the swivel stem has a fitting for receiving the box of a tool joint, pipe section, or Kelly joint to establish communication between the interior of the swivel stem, which of course, is a hollow flow passage, and the interior of such a pipe or conduit. The mechanism, of necessity, must be very rugged of construction because during raising and lowering operations of the pipe string the entire weight of the pipe string must be suspended by the swivel. During normal operations of the swivel, the vast majority of the weight of the string of pipe is suspended by the swivel for it is usually desirable only to have approximately that portion of the weight of the drill stem resting upon a drill bit equal to about the weight of the drill collars or drilling subs. At the same time, a swivel action must be provided which is fluidtight to permit circulation of fluid, such as drilling mud, under high pressure frequently amounting to three thousand pounds per square inch or more.

The thrust of the swivel stem due to the weight of the suspended pipe is borne by the superposed bearing assemblies and the arrangement is such that the thrust load is distributed substantially equally or in accordance with any predetermined ratio through the two bearing assemblies. Due to the swingletree connection between the bail and the thrust bearing elements supported by the swivel housing, these bearing elements are enabled to move to and fro sufficiently to always maintain contact between the elements of the bearing assemblies and if the load on one of the assemblies tends to exceed that of the other or to exceed the predetermined ratio of the load distribution, then a very slight rocking of the crossbars 35 and 36 about the bail end pivots will automatically be affected to redistribute the thrust load in accordance with the predetermined ratio. By this means, the radial extension of the roller bearings 18 may be maintained at a minimum to still provide sufficient bearing area to withstand the thrust to be encountered. These bearing elements 18 preferably are formed as frusto-conical members such that were the cones extended their apices would substantially coincide with the rotational axis of the swivel stem. Thus, a rolling action is obtained and by maintaining the radial extension of the bearings at a minimum, the velocities of any bearing part are materially held down over the arrangement where all of any increased bearing area must be provided by extending the bearing elements 18 radially. That is, lengthening the conical bearing elements.

The arrangement is such that the bearings, together with the lubricant seals, may all be lubricated and a separate reservoir, having communication with the main portion of the interior of the housing, is provided for lubricant to maintain sufficient lubricant level within the housing to properly lubricate the upper bearing for centering the upper end of the swivel stem and taking the upward thrust of the swivel stem. This lubricant reservoir will maintain its proper level even though the lubricant within the lower portion of the housing should drain due to faulty packing or the like. In most instances, the escape of lubricant from the lower portion of the housing will be noticed before the level of lubricant within the interior of the housing can drop below the upper one of the two thrust bearings for taking the downward thrust of the swivel stem.

The housing is provided in two principal portions or parts which may move slightly relative to one another to permit slight to and fro movement of the two bearing surfaces for taking the downward thrust of the swivel stem.

It will be seen from the foregoing description that the objects of this invention have been accomplished. There has been provided a simple, yet rugged construction for increasing the area of the bearing surface for withstanding the load due to pipe suspended from a rotary swivel and yet wherein the over all weight and size of the swivel may be reduced over conventional rotary swivels heretofore used which provide an equivalent bearing area. The arrangement is such that the individual bearing elements or rollers do not extend radially as far from the rotational center of the swivel stem as has been the case heretofore in swivels having comparable bearing capacity, thus reducing the linear velocity of the bearings and cutting down the amount of wear, particularly where some slippage occurs between the bearing races and the bearing rollers. The construction is such that the thrust load may be distributed to the plurality of bearings in accordance with a predetermined ratio and this distribution will be automatically maintained in operation. There has been provided a swivel having correlated but separate lubricating systems for lubricating the main thrust bearings and the centering and upward thrust bearings of the swivel stem journal.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. An apparatus which comprises a housing having two parts relatively movable along the longitudinal axis of the housing, a rotatable shaft received in said housing, separate spaced shaft thrust bearing elements carried by the housing parts, a fastening member for connecting the apparatus to an elevator or the like, said member having a counterbalancing connection with each of the housing parts whereby the load upon the thrust bearing elements will be substantially equalized and transmitted to the fastening member.

2. In a rotary swivel a housing having two parts relatively movable along the longitudinal axis of the housing, separate spaced swivel stem thrust bearing elements carried by the housing parts, a fastening member for securing the swivel to an elevator or the like, said member having a swingletree connection with each of the housing parts whereby the load upon the thrust bearing elements will be substantially equalized and transmitted to the fastening member.

3. In a rotary swivel a housing having two parts relatively movable along the longitudinal axis of the housing, separate spaced swivel stem thrust bearing elements carried by the housing parts, a bail adapted to secure the swivel to an elevator or the like, a swingletree connection between each end of the bail and the two housing parts whereby the load upon the thrust bearing elements will be substantially equalized and transmitted to the bail.

4. In a rotary swivel a housing having two parts reltaively movable along the longitudinal axis of the housing, separate spaced swivel stem thrust bearing elements carried by the housing parts, a bail adapted to secure the swivel to an elevator or the like, a swingletree connection between the base of each of the two housing parts whereby the load upon the thrust bearing elements will be substantially equalized and transmitted to the bail.

5. A rotary swivel comprising a housing having two parts relatively movable along the longitudinal axis of the housing and seal means forming a seal between said parts, separate spaced swivel stem thrust bearing elements carried by the housing parts, a swivel stem, anti-friction bearing means between each of the bearing elements and the swivel stem, said bearing means rotatably mounting the swivel stem, a fastening member adapted to secure the device to an elevator or the like, swingletree connection means between the fastening member and the housing parts whereby the load upon the thrust bearing elements will be substantially equalized and transmitted to the fastening member.

6. A rotary swivel comprising a housing having two parts relatively movable along the longitudinal axis of the housing and seal means forming a seal between said parts, separate spaced swivel stem thrust bearing elements carried by the housing parts, a swivel stem, anti-friction bearing means between each of the bearing elements and the swivel stem, said bearing means rotatably mounting the swivel stem, a bail adapted to secure the device to an elevator or the like, swingletree connection means between the bail and the housing parts whereby the load upon the thrust bearing elements will be substantially equalized and transmitted to the bail.

7. A rotary swivel comprising a housing having two parts relatively movable along the longitudinal axis of the housing and having telescoping portions forming a joint therebetween with seal means for the joint, separate spaced swivel stem thrust bearing elements carried by the housing parts, a swivel stem, anti-friction bearing means between each of the bearing elements and the swivel stem, said bearing means rotatably mounting the swivel stem, a bail, crossbar means pivotally connected to the bail ends, two bolts pivotally connected to each cross bar equidistant from its bail connection, one bolt supporting one housing part against downward motion and the other bolt supporting the other housing part against downward motion.

8. An apparatus for supporting a rotating stem which comprises, in combination, a housing having a longitudinal axis, a rotatable stem received in said housing coaxially with the longitudinal axis thereof, said housing having two parts relatively movable along said longitudinal axis and having telescoping portions between said two parts forming a joint therebetween, an inturned flange on each of the two parts, a thrust bearing assembly on top of each of the flanges, a pair of out-turned flanges carried by said stem and each supported on top of one of said thrust bearing assemblies whereby said stem is rotatably supported by said two housing parts, a fastening member, a crossbar means pivotally connected intermediate its ends to the fastening member, and two bolts pivotally suspended from opposite ends of said crossbar means, one bolt supporting one housing part and the other bolt supporting the other housing part whereby the load imposed on said bearing assemblies by said stem will be substantially equalized and transmitted to said fastening member.

9. The apparatus of claim 8 in combination with a bearing means between the housing and stem for resisting upward thrust of and for centering the latter and an upstanding annular shield carried by said stem and extending at least as high as and externally around last said bearing means to provide a grease retaining reservoir therefor.

ROBERT L. CRAIN.

REFERENCES CITED

The following references are of record in the file of this patent:

UNITED STATES PATENTS

| Number | Name | Date |
|---|---|---|
| 1,734,223 | Melott | Nov. 5, 1929 |
| 1,748,269 | Wray | Feb. 25, 1930 |